Annette Hurst
INVENTOR

Patented Apr. 1, 1924.

1,489,216

UNITED STATES PATENT OFFICE.

ANNETTE HURST, OF WINCHESTER, KENTUCKY.

COOKING DEVICE.

Application filed January 30, 1922. Serial No. 532,793.

*To all whom it may concern:*

Be it known that I, ANNETTE HURST, a citizen of the United States, residing at Winchester, in the county of Clark and State of Kentucky, have invented new and useful Improvements in Cooking Devices, of which the following is a specification.

This invention relates generally to cooking utensils and has particular relation to cooling devices for supporting cakes, pies, bread or the like, after baking.

An object of the present invention is to provide a simple cooling device which embodies a number of distinct advantages, such as for example the provision of a cooler formed of a thin metallic perforated plate to provide lightness and to prevent sweating of the bottom of the cake and which perforated portion is surrounded by an imperforate margin, to permit of the use of the cooler while the cake is being iced, the imperforate margin acting to catch the icing which might run down the side of the cake, while a bead which extends around the margin prevents accidental overflow of the icing, in addition to providing a reinforcement of the thin plate.

With the above and other objects in view, the invention further includes the following novel features and details of construction, to be hereinafter more fully described, illustrated in the accompanying drawings and pointed out in the appended claim.

In the drawings:—

Figure 1:
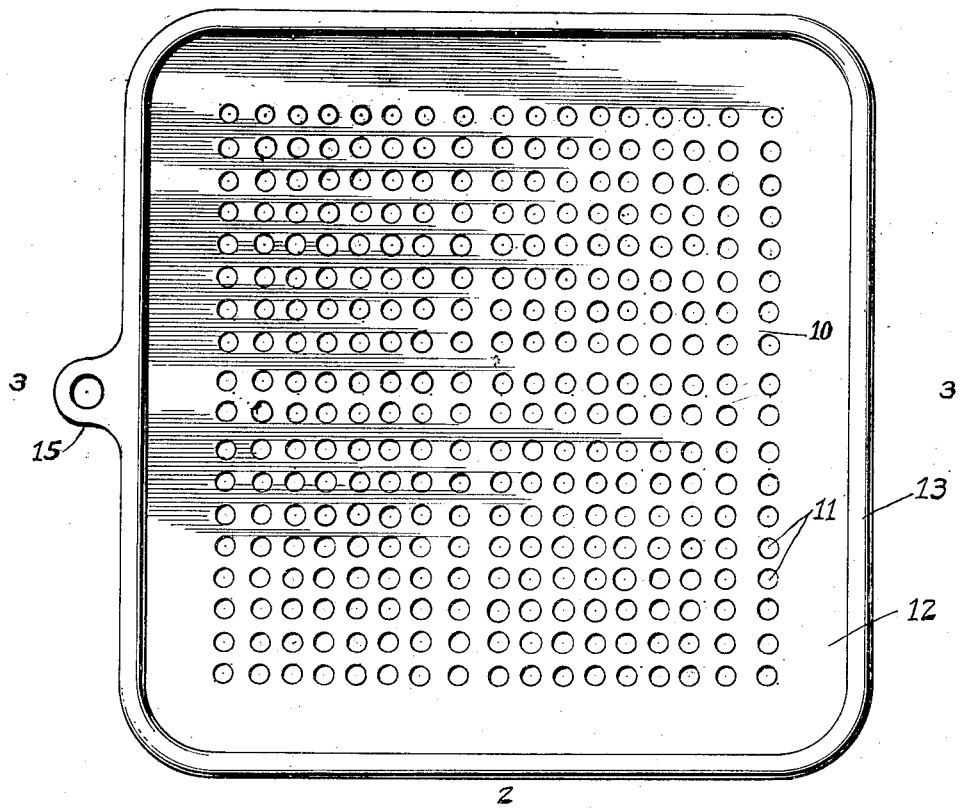
Figure 1 is a plan view of a cake cooler constructed in accordance with the invention.
Figure 2:
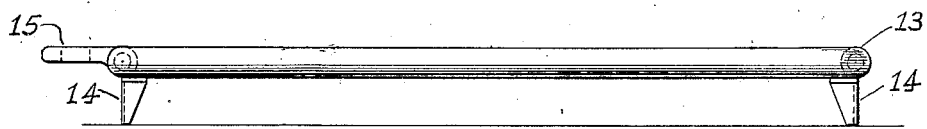
Figure 2 is an edge view of the same.
Figure 3:
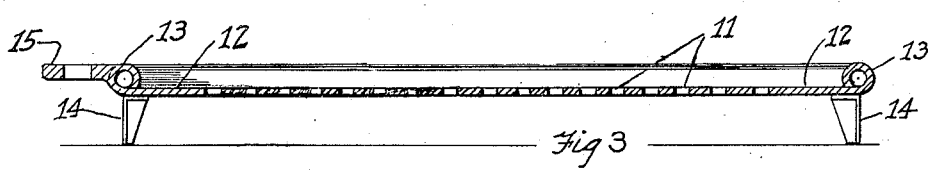
Figure 3 is a vertical sectional view through the cooler.

Referring in detail to the drawings, wherein like characters of reference denote corresponding parts, the invention which may be made of sheet metal, or may be cast of aluminum to provide lightness, comprises a thin metallic plate 10, which is perforated for a greater portion of its area as at 11, this perforated portion being designed to support a cake in a manner to provide air circulation and thereby prevent sweating. The cooler may be made of any desired shape, such as square, oblong, round or elliptical and may if desired fit within a dish or other receptacle.

Surrounding the perforated portion of the plate is an appreciably wide imperforate margin 12, while surrounding this margin is a raised bead 13. The imperforate margin 12 is designed to receive icing which might run down the sides of the cake, while the bead 12 prevents overflow of the icing and retains the same upon the plate. In addition, this bead acts to reinforce the thin metallic plate so as to provide a light stiff structure.

The plate or cooler is supported upon legs 14 which act to space the same above the table or other support so as to provide for a circulation of air through the perforations 11. If desired, the cooler may be provided with an aperture or hooked lug 15 to provide means for hanging.

When the foregoing description is taken in connection with the accompanying drawings, it will be seen that the invention provides a device of a light and strong construction, upon which a cake may be placed for the purpose of cooling and icing, the construction being such as to prevent overflow of the icing. If desired the cake may be left upon the cooler and the latter positioned within a suitable dish or receptacle for serving.

The invention is susceptible of various changes in its form, proportions and minor details of construction and the right is herein reserved to make such changes as properly fall within the scope of the appended claim.

Having described the invention what is claimed is:—

A cake cooler comprising a thin flat perforated plate, a wide imperforate margin extending around the perforated portion in the same horizontal plane, a bead extending upwardly around the outer edge of the imperforate margin around the plate and defining a combined stiffening and retaining bead and legs extending downwardly from the edge of the plate.

In testimony whereof I affix my signature.

ANNETTE HURST.